Figure 1:
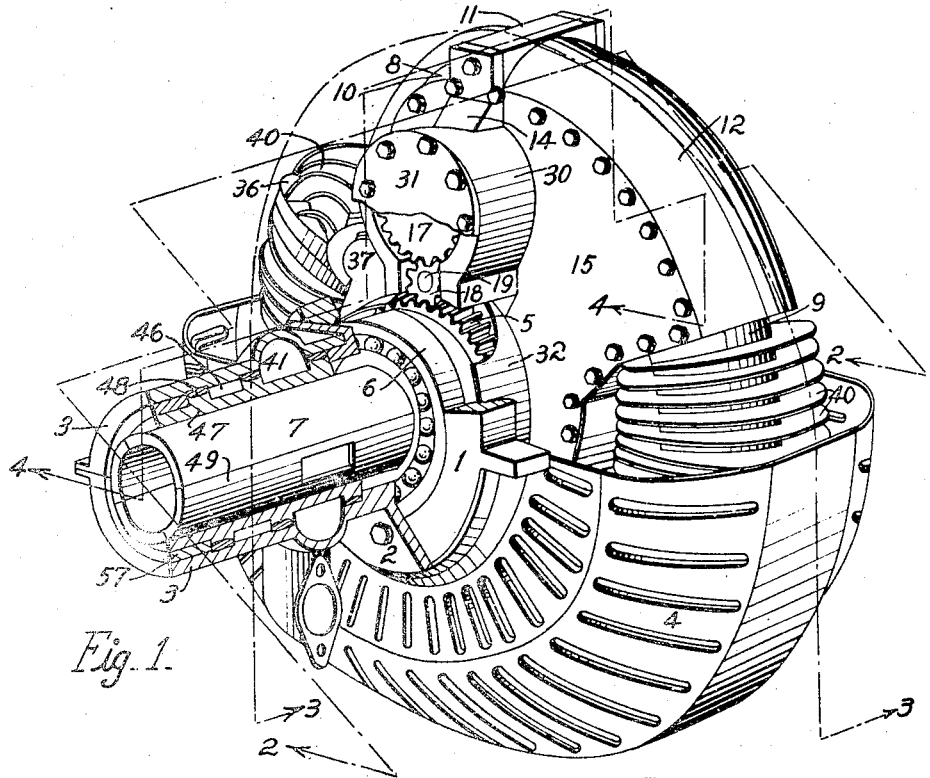

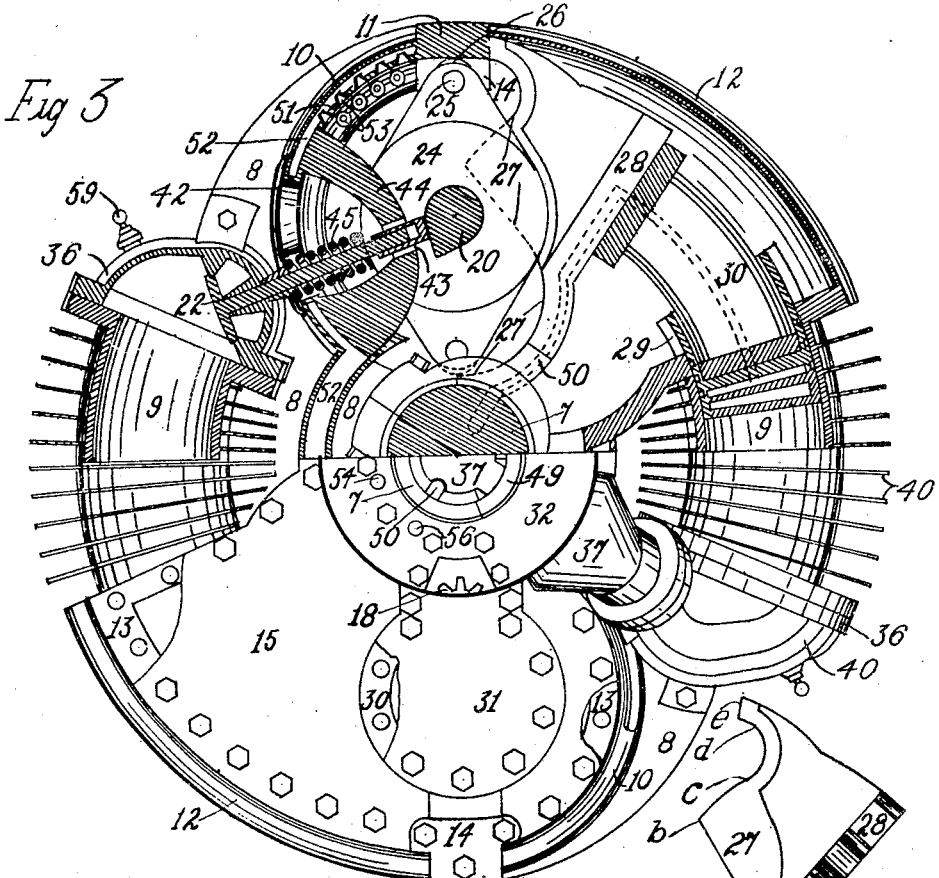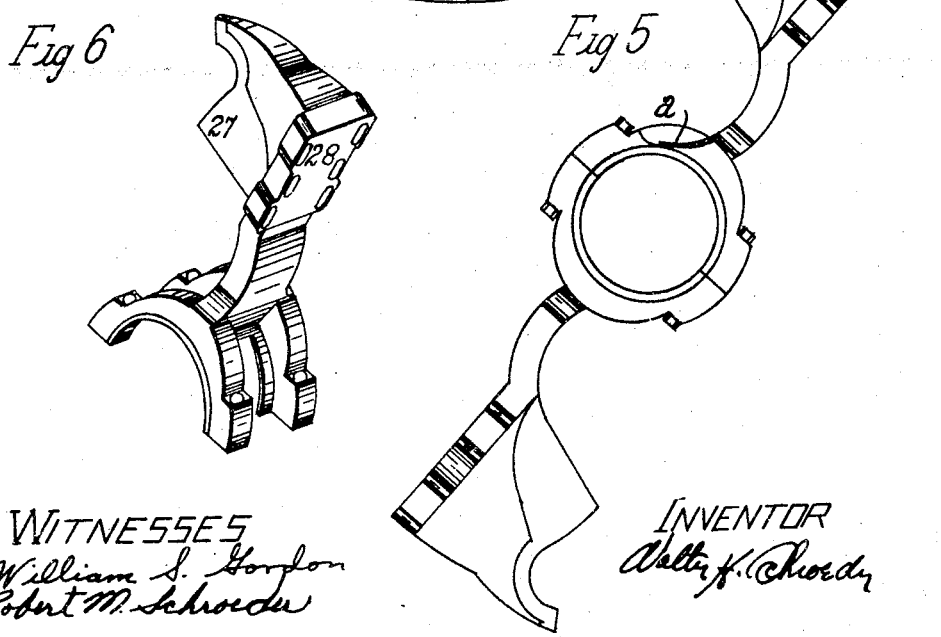

Patented Jan. 7, 1947

2,413,734

UNITED STATES PATENT OFFICE 2,413,734

ROTARY INTERNAL-COMBUSTION ENGINE

Walter H. Schroeder, Los Angeles, Calif.

Application January 5, 1942, Serial No. 425,607

2 Claims. (Cl. 123—43)

My invention relates to an internal combustion engine but particularly to a rotary internal combustion engine. In the accompanying drawings, I prefer to show a two cylinder four cycle gas engine with each cylinder having two work strokes per revolution of the drive shaft.

The object of my invention, compared with the crank type of engine, is first, to increase the horsepower per unit weight of the engine by causing a cylinder of equal size to deliver more work to the drive shaft in equal time, i. e., to make the cylinder have more work strokes per revolution of the drive shaft; second, to increase the power applications around the drive shaft and thus permit the drive shaft to deliver the same amount of work in a lesser number of revolutions per unit of time—by having a constant and longer lever arm and by making the driving force on the lever arm at all times tangent to the radius of the drive shaft; third, to increase the thermal efficiency, i. e., to convert a greater percentage of the heat generated in to work, by permitting the heated gases after combustion, to expand more immediately and at a constant rate of speed, on the theory, that if the gases expand thusly, there will be less loss of heat, and permit the efficiency in actual practice, of adiabatic and isothermal expansion and expansion at constant pressure to approach more closely the theoretical efficiency, in other words to decrease entropy; fourth, to develop a cycle that will permit the fuel charge to reach atmospheric pressure before compression by permitting the motion of the piston with respect to the cylinder to remain nil sufficiently long, before the compression stroke; fifth, to provide a conduit for carrying fuel through a hollow drive shaft from a manifold fixed around the revolving drive shaft, to the cylinders; sixth, to provide a conduit through a hollow drive shaft for exhausting or scavenging the hot burned gases; seventh, to provide for cooling the exhaust conduit and prevent it from conducting heat to the drive shaft as it passes through it; eighth, to provide a method of cooling the cylinders by revolving them through the air; ninth, to provide an electric conduit from a commutator fixed around the revolving drive shaft and passing through the hollow drive shaft to the spark plugs; tenth, to provide an oil duct from an oil manifold fixed around the revolving drive shaft and passing through the hollow drive shaft to feed the various ducts that lubricate the various parts of the rotor; and eleventh, to provide housing and facilitates for preventing the oil from scattering and to conduct it to an oil reservoir; and twelfth, to provide a mechanism for controlling and directing two equal, opposite and concentric forces that vary uniformly the same, created in a combustion chamber, the first acting on a cylinder and the second on a piston of an internal combustion engine, so that these forces, the first acting directly and the second indirectly, will each simultaneously cause a rotor to rotate about a stator in the same direction and cause each force to create approximately the same moment equal to one-half the total amount about the center line of the drive shaft.

I attain these objectives by the mechanism illustrated in the accompanying drawings, in which—

Figure 2:
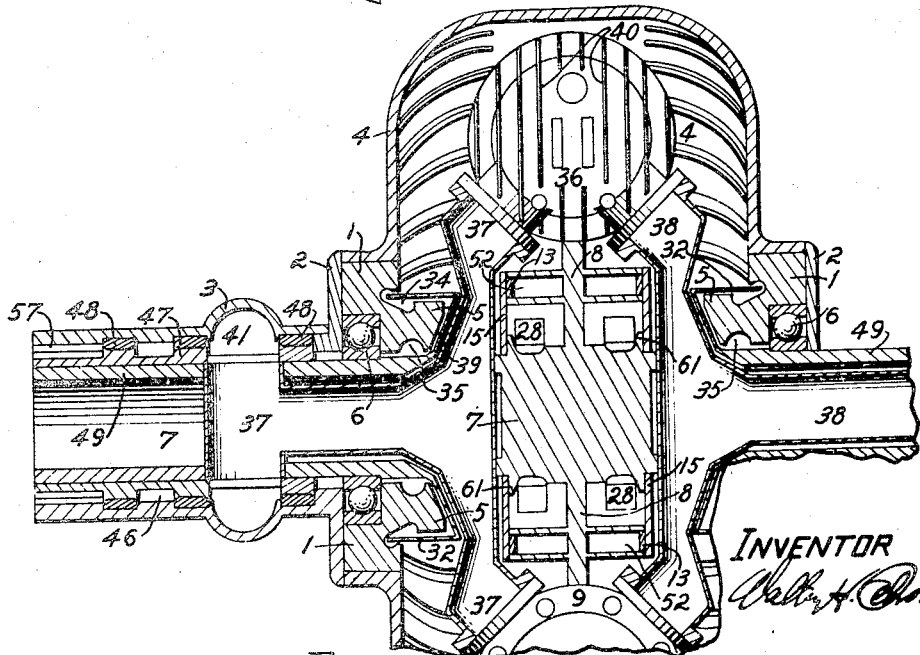
Figure 4:
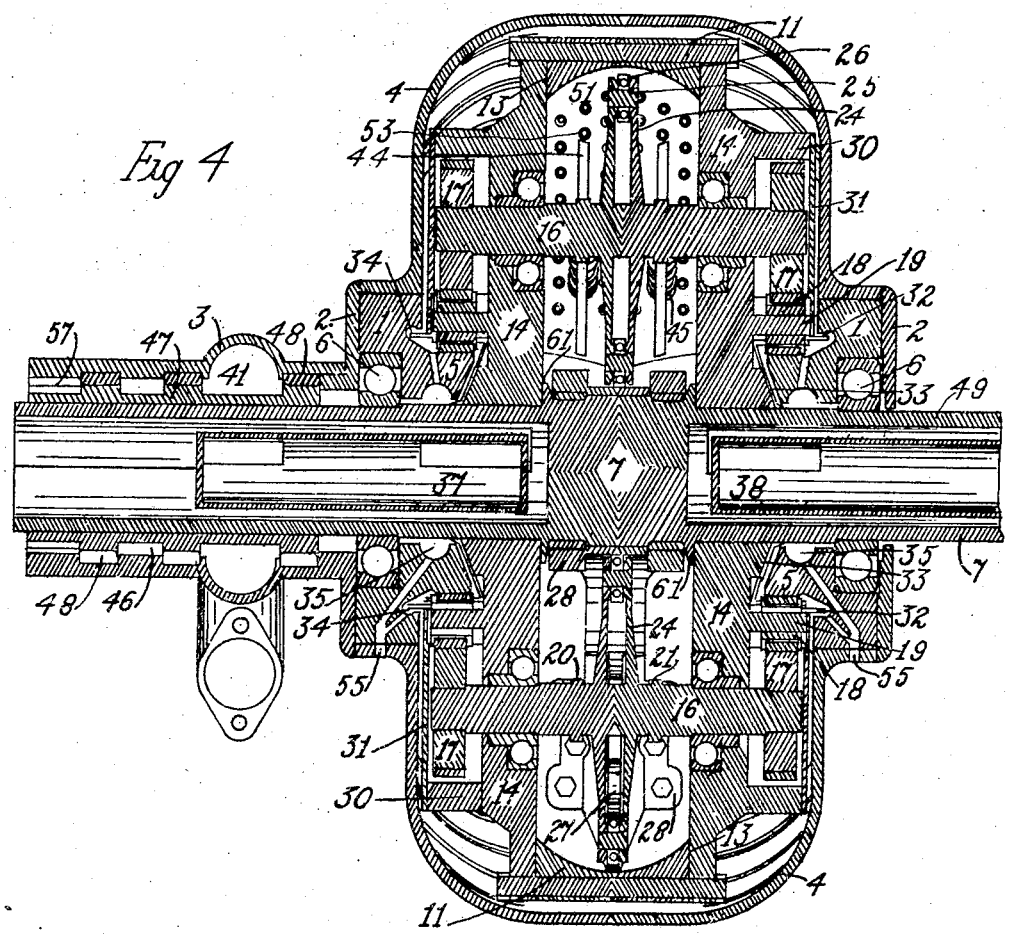
Figure 7:
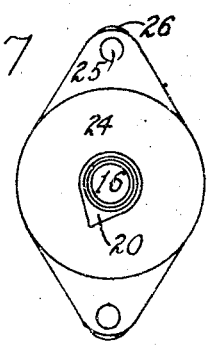
Figure 8:
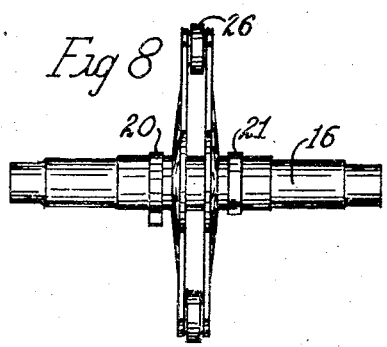

Figure 1 is a perspective of the engine with the upper half of guard plate 4 removed and parts of hanger 1, cover plate and manifold 2 and 3 respectively, sleeve 47, and plates 31 and 32 cut away. Figure 2 shows section 2—2, Fig. 1. Figure 3 shows section 3—3, Fig. 1 of the rotor in the upper half and an elevation of the rotor in the lower half. Figure 4 shows section 4—4, Fig. 1. Figures 5 and 6, an elevation and perspective respectively, show cams 27 and arms 28. Figures 7 and 8 show two different elevations of shaft 16, wheel 24 and cams 20 and 21.

Similar numerals refer to similar parts throughout the several views. Hangers 1 together with the combination cover-plates manifolds 2 and 3 respectively and the guard plates 4 constitute the framework of the engine, with the cog-wheels 5 fixed to the hangers 1, all integral parts, form the stator. The rotor consists of drive shaft, cylinders, pistons, and motivating parts, hereinafter referred to, together with pinions that mesh with the cog-wheels 5 and cause the rotor to revolve about the stator.

In the hangers 1 are placed the bearings 6 in which turns the hollow drive shaft 7. To the drive shaft 7 are fixed the webs 8, being an integral part of same. The webs 8 carry the arciform cylinders 9. The webs 8 also carry the circumferential housing or casing 10, terminating in the crown members 11 and continuing as the circumferential housing 12 to the second cylinder 9, all constituting an integral part and all terminating in the flange 13, every part of which lies in the same vertical plane. Standards 14 and plates 15, together forming an integral part, is attached to the hollow drive shaft 7 by passing the latter through a central annular opening in the former and seating and bolting the former to the flanges 13 and 61. Plates 15 together with casings 10 and 12 form a housing around the motivating parts and confines the lubricating oil. The circumferential flanges 30 fixed to the standards 14 and outlining the cog-wheels 17 and 18 together with plates 31 and the circumferential annular plates 32 formed around and over the fixed gears 5 and bolted to the flange 33 which forms an integral part of the plates 15, completes the housing of the motivating parts and directs the lubricating oil to gears 5, 17, and 18, grooves 34 or spaces 35. The standards 14 journal the shafts 16 at a suitable distance from the center lines of the drive shaft 7. Shafts 16 rotate with an angular velocity opposite in direction to that of the drive shaft 7 and with twice its magnitude. This action is accomplished by having the shafts 16 carry the cog-wheels 17 geared to the pinions 18 which turn on the trunions 19 fixed to the standards 14; these pinions 18 mesh with the fixed cog-wheels 5. Attached to the shafts 16 are the cams 20 and 21 that lift the intake valves 22 and the exhaust valves 23 respectively. Also attached to the shafts 16 and rotating with same are the built-up wheels 24, each consisting of a hub and two plates elongated along the diameter and forming two arms through which the pins 25 pass and on which the rollers 26 turn. As the wheels 24 turn, the rollers 26 engage the cams 27, hereinafter referred to. The cams 27 form an integral part of the arms 28 that turn on the drive shaft 7. The motion imparted to the arms 28, through the mechanism of the wheels 24 contacting the cams 27, is conveyed to the arciform pistons 29 (which work in the cylinders 9) through the arcuated connecting rods 30. The arms 28 are joined together as integral parts so that the pistons 29 act together with the same motion, but when one of the pistons is making a compression stroke the other is making an exhaust or scavenging stroke and so when one piston cooperating with a cylinder to make a work stroke the other cylinder is making a suction stroke etc. This is accomplished by simply adjusting the cams 20 and 21 on the shaft 16.

Just before and just after the rollers 26 engage the cams 27, the pistons and cylinders are traveling at the same angular velocity, i. e., the motions of the pistons with respect to the cylinders is nil. This condition continues until the rollers 26 engage that part of the cams 27 at $a$, when the pitch of the cams 27 begins to increase gently and the pistons 29 are moved forward in the cylinders 9 on the compression and exhaust strokes. The compression and exhaust strokes are completed when the rollers 26 engage the cams 27 at the points $b$. As the wheels 24 continue to revolve, the points $b$ of the cams 27 roll slightly off the rollers 26 so that the rollers gain a position on the points $b$ ready for the work and suction strokes. At this time ignition and combustion takes place in one of the cylinders, the rollers 26 move along the cams 27 to the points $c$. During this period, the angular velocity of the pistons 29 is nil, but the pressure of the expanding gases drive the cylinders 9 forward and also communicate to the wheels 24 through the integral parts (pistons, connecting rods, arms, and cams) a force approximately equal, opposite, and parallel to the force acting on the cylinders. Through the motivating parts already described, these two forces are directed simultaneously and respectively to the standards 14 and the wheels 24. Since the standards 14 journal the shafts 16 to which the wheels 24 and the gears 17 are fixed, these two opposite forces constitute a couple that cause the wheels 24 and the gears 17 to turn, thus directing their force to the fixed gears 5 through the pinions 18 and cause the rotor to rotate about the stator in the same direction that the forces on the cylinders, by direct action, cause the rotor to rotate. So that these two opposite forces acting on the cylinders and the pistons may be most effectively directed to the drive shaft, their two systems of motivating parts that direct these forces must be in balance, that is, so designed that they create the same moments about the center line of the drive shaft and thus merge the two systems in to a single cooperating unit. To accomplish this unification, the ratio of the radii of the gears 17 to the gears 5 must be approximately equal to the ratio of the magnitudes of the maximum line drawn from the center line of the shaft 16 to the perimeters of the rollers 26, to the line drawn from the center line of drive shaft 7 to the center line of the cylinders 9. As the rollers 26 engage the cams 27 at the points $c$, the pitch of the cams 27 is again manifest by an increasing angular velocity of the pistons 29 up to where the rollers 26 contact the cams 27 at the points $d$ when the angular velocity of the pistons 29 again equals that of the cylinders 9 and the points $e$ of the cams 27 engage the sides of the members 11 which are also traveling at the same angular velocity. This motion continues until a repetition of the cycle is commenced as the opposite arms of the wheels 24 engage the cams 27 at the points $a$. This combination of motivating parts permits the gases in the cylinders after combustion to expand at a uniform rate of speed and permits the fuel charge to reach atmospheric pressure before the combustion stroke begins. The cam that motivates the pistons in the afore described cycle, consists of segments of circles with three different radii, a tangent, and the segment of an ellipse coincident with the locus of an imaginary fixed point (on the perimeter of the rollers 26 a maximum distance from the center line of the shafts 16) as the rotor revolves. Those parts of the cam path denoted by $a$ to the beginning of the path, and $d$ to the end of the path are segments of a circle with radii equal to the distance from the center line of the shafts 16 to the maximum outside point on the perimeters of the rollers 26, this permits the rollers 26 to engage and leave the cam path with smoothness. The distance from the point $a$ to the point $b$ on the cam path follow the segment of a circle and its tangent, so chosen, that the radii of the wheels 24, as the wheels 24 contact the cam path through the rollers 26, is at all times close to the normal, as is practicable, of the circle and its tangent. This assures a gentle pitch for the cam path. As the point $b$ on the cam path roll slightly off the rollers 26, the rollers engage that part of the cam path that is coincident with the path of an imaginary fixed point on the perimeters of the rollers hereinbefore described, as the rotor turns. Where the gear ratio between the gears 17 and 5 is as 1 is to 2, as in this case, the cam path from the point $b$ to the point $c$ follows the segment of an ellipse, however, a different gear ratio than that already referred to, would create a different ellipse or curve. That part of the cam path from the point $c$ to the point $d$ is the segment of a circle that adapts itself very well for gently increasing the angular velocity of the pistons to that of the rotor, because at this point the direction of the elliptical path begins to reverse itself and assume a somewhat circular shape whose radius approximates that of the radius of the cam path, all of this results in a rotary movement, that is, the rollers 26 tend to rotate in the cam path that generates a gentle pitch and increases the angular velocity of the pistons to that of the rotor. During the time that the rollers engage the cam path from the point d to the point e plus the time the opposite rollers 26 engage the cam path from the beginning of the cam path to the point a, the motion of the pistons with the respect to the cylinders is nil. It is during this period that the fuel charge reaches atmospheric pressure before the compression stroke begins. This cam path gives smoothness and continuity to the pistons as it motivates them through their cycle and adapts itself well to any variations in this cycle if desired.

To the cylinder heads 36 are attached the fuel ducts 37 and the exhaust ducts 38 which pass down through the walls of the drive shaft 7 and out through the center of the hollow shaft 7, thence the fuel supply ducts 37 terminate and connect with fuel supply space 41 formed by the manifold 3 and sleeve 47 (an integral part of shaft 7). Manifold 3 journals the bearings 48 in which sleeve 47 turns. Where the ducts 37 and 38 pass through the walls and out through the center of the hollow shaft 7 a suitable air-space 39 is left between the ducts and the walls of the shaft to permit cooling facilities. It should be noted that for purposes of assembly, the parts of the drive shaft marked 49, plates 32, and ducts 37 or 38 are fabricated as a unit. To the cylinders 9 and the cylinder heads 36 are fixed cooling vanes 40 so pitched as to create a suitable circulation of air as the cylinders rotate and thus provide cooling facilities for the cylinders. Intake valves 22 and exhaust valves 23 seated in the cylinder heads 36 pass the housing 10 through the guide plates 42 then through the guides 43 supported by the brackets 44 that also support the valve springs 45.

All cylinders, pistons, bearings, and other parts that have to be lubricated, are done so by a suitable oil force feed system. From the oil supply space 46 formed by the manifold 3 and sleeve 47 turning in the bearings 48, the oil passes along the main oil feed duct 50 to the various ducts that lubricate the moving parts. Together with circumferential flanges 10 the flanges 51 form an outer and inner shell to form the oil trap 52. This trap 52 catches the oil forced by pressure in the casing from the casing through the conical perforations 53 extending in to the traps 52. The oil thus trapped is forced along to the ducts 54 that empty in to the spaces 35, then drains to the outlets 55 which lead to the oil reservoir. There are also ducts 56 connecting the casing with the spaces 35 and helps to conduct the excess oil from the casing to said spaces 35.

The commutator 57 serves as a medium for transmitting an electric current from the stator to the rotor, the electric conduit 58 carrying the current to the sparkplugs 59. To provide proper facilities for keeping the cams 27 in contact with either the rollers 26 or the members 11 at all times, tension springs 60 are attached to the standards 14 and arms 28.

I am aware that prior to my invention, rotary internal combustion engines have been designed with a rotor rotating in or about a stator. I do not claim such a combination broadly; but

I claim:

1. In a rotary internal combustion engine, a stator, a rotor having a shaft, means journaling the shaft for rotation relative to the stator, an arcuate cylinder disposed circumferentially of the shaft, means securing the cylinder to and radially spacing it from the shaft, an arcuate piston reciprocably mounted in the cylinder, a radial arm rotatably mounted on the shaft and secured to the piston, fuel valve means operable to admit fuel to the cylinder, means for actuating said valve, an exhaust valve in the cylinder, means for actuating the exhaust valve in timed relation to actuation of the fuel valve means, cam means operatively connected with the stator and rotor to intermittently move the piston inwardly of the cylinder, and spark means associated with the cylinder to ignite fuel in the cylinder whereby to urge the cylinder and piston in opposite directions circumferentially of the axis of the shaft, said cam means being operable in response to the last-mentioned movement of the piston to urge the rotor in the opposite direction.

2. The engine of claim 1 wherein the operative connection of the cam means to the stator and rotor comprises a gear secured to the cam means, a gear stationarily secured to the stator, and a pinion gear interposed between and meshing with both the first-mentioned gears.

WALTER H. SCHROEDER.